United States Patent
Gogmos et al.

(10) Patent No.: US 12,253,866 B2
(45) Date of Patent: Mar. 18, 2025

(54) METHOD FOR DETECTING OVERHEATING OF A HEATING DEVICE, AND CORRESPONDING CONTROL UNIT

(71) Applicant: Valeo Systemes Thermiques, Le Mesnil Saint Denis (FR)

(72) Inventors: Erwan Gogmos, Le Mesnil Saint-Denis (FR); Bertrand Puzenat, Le Mesnil Saint-Denis (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 865 days.

(21) Appl. No.: 17/291,502

(22) PCT Filed: Nov. 5, 2019

(86) PCT No.: PCT/FR2019/052616
§ 371 (c)(1),
(2) Date: May 5, 2021

(87) PCT Pub. No.: WO2020/194969
PCT Pub. Date: May 14, 2020

(65) Prior Publication Data
US 2022/0004212 A1    Jan. 6, 2022

(30) Foreign Application Priority Data
Nov. 6, 2018    (FR) ...................... 1860226

(51) Int. Cl.
*G05D 23/19* (2006.01)
*H05B 3/00* (2006.01)
*H05B 1/02* (2006.01)

(52) U.S. Cl.
CPC ....... *G05D 23/1917* (2013.01); *H05B 3/0023* (2013.01); *H05B 1/0236* (2013.01);
(Continued)

(58) Field of Classification Search
CPC .. H05B 3/0023; H05B 3/0042; H05B 1/0236; H05B 2203/019; H05B 2203/02;
(Continued)

(56) References Cited

U.S. PATENT DOCUMENTS

| | | |
|---|---|---|
| 2013/0327124 A1 | 12/2013 | Schneider et al. |
| 2015/0122899 A1 | 5/2015 | Kaneko et al. |
| 2016/0143090 A1 | 5/2016 | Tellier et al. |

FOREIGN PATENT DOCUMENTS

| | | |
|---|---|---|
| CN | 101434184 A | 5/2009 |
| CN | 101586517 A | 11/2009 |

(Continued)

OTHER PUBLICATIONS

International Search Report with Written Opinion in corresponding International Application No. PCT/FR2019/052616, mailed Feb. 12, 2020 (13 pages).
Office Action issued in counterpart Chinese Application No. 201980067824.1, dated Nov. 15, 2023 (27 pages).
Office Action issued in counterpart European Application No. 19818214.9, dated Dec. 20, 2023 (8 pages).

*Primary Examiner* — Phuong T Nguyen
(74) *Attorney, Agent, or Firm* — Osha Bergman Watanabe & Burton LLP

(57) ABSTRACT

The present invention relates to a method for detecting overheating of an electrical heating device comprising a plurality of resistive elements configured to be supplied electrically using a control signal by pulse width modulation according to a setpoint, comprising the following steps: —detecting the setpoint, —detecting the duty cycle (PWM_system; PWM_subsystem), —defining a threshold value for detecting the duty cycle according to the setpoint, or a value of at least one parameter for monitoring an incidence of overheating, —comparing the detected duty cycle value with the detection threshold value, and —detecting an incidence of overheating when the detected duty (Continued)

cycle value reaches the detection threshold value. The invention also relates to a corresponding control unit.

17 Claims, 3 Drawing Sheets

(52) U.S. Cl.
CPC .... *H05B 2203/019* (2013.01); *H05B 2203/02* (2013.01); *H05B 2203/023* (2013.01)

(58) Field of Classification Search
CPC ............. H05B 2203/023; G05D 23/19; G05D 23/1902; G05D 23/1917; B60H 2001/00128; B60H 2001/0015; B60H 1/0073; B60H 2001/00733; B60H 1/00735; B60H 2001/2228; B60H 1/2215; B60H 1/2218
USPC ........................................................ 219/490
See application file for complete search history.

(56) References Cited

FOREIGN PATENT DOCUMENTS

| | | | | | |
|---|---|---|---|---|---|
| CN | 102027804 | A | | 4/2011 | |
| CN | 103913637 | A | | 7/2014 | |
| CN | 103926953 | A | | 7/2014 | |
| CN | 105532072 | A | | 4/2016 | |
| CN | 106153790 | A | | 11/2016 | |
| DE | 102007009731 | A1 | | 9/2007 | |
| DE | 102016109039 | A1 | * | 8/2017 | ........... H05B 1/0236 |
| DE | 102016216295 | A1 | | 3/2018 | |
| EP | 2371588 | A1 | * | 10/2011 | ........... B60H 1/2218 |
| EP | 2772820 | A1 | | 9/2014 | |
| FR | 2997248 | A1 | | 4/2014 | |
| JP | 2007059097 | A | | 3/2007 | |
| KR | 20100130820 | A | | 12/2010 | |
| WO | 2018142064 | A1 | | 8/2018 | |

* cited by examiner

METHOD FOR DETECTING OVERHEATING OF A HEATING DEVICE, AND CORRESPONDING CONTROL UNIT

The invention relates to the detection of overheating of an electrical heating device for heating a fluid. Nonlimitingly, the electrical heating device may be configured to heat, for example, an air flow intended to flow through the heating device. The invention may be applied equally well to a high-voltage electrical heating device as to a low-voltage electrical heating device.

The invention especially applies to a motor-vehicle heating and/or ventilation and/or air-conditioning apparatus comprising such a heating device.

A motor vehicle is commonly equipped with such a heating and/or ventilation and/or air-conditioning apparatus, which is intended to regulate aerothermal parameters of an air flow intended to be delivered to the passenger compartment, and in particular the temperature of the air flow. To do this, the apparatus generally comprises one or more heat-treatment devices, and especially an electrical heating device (also called an electrical radiator) for heating a fluid such as an air flow.

The electrical heating device comprises electrical heating modules. By way of example, the electrical heating modules may be arranged so as to be directly exposed to an air flow flowing through the electrical heating device.

According to one known solution, the heating modules comprise resistive elements that for example have a positive temperature coefficient (PTC), i.e. elements such as PTC ceramic resistors.

It is a question of elements the resistance of which varies greatly as a function of temperature. More precisely, the ohmic value of PTC resistive elements increases very rapidly beyond a preset temperature threshold.

The resistive elements may be supplied by an on-board electrical voltage source, namely batteries. An electrical connector may be connected to the voltage source located on-board the vehicle, so as to allow the required electrical power to be supplied to the electrical heating device, and especially to the resistive elements. Furthermore, the resistive elements are controlled by an electronic control unit that generally comprises an electrical supply circuit. The electrical supply circuit is for example mounted on a printed circuit board.

In particular in the case of a high-voltage electrical heating device, it may be a question of a main heating device of the vehicle and which may therefore be very powerful.

In the event of overheating, the device may reach at at least one point a temperature limit of correct operation of the system. PTC ceramic resistors are used to protect against excessive overheating that could, for example, start a fire, thus allowing the safety of passengers to be guaranteed.

However, certain components close to the electrical heating device, such as for example plastic parts of the heating and/or ventilation and/or air-conditioning apparatus, may be more sensitive especially under certain conditions, for example in the case of a high temperature when the shutters of the heating and/or ventilation and/or air-conditioning apparatus are closed, intentionally or due to an undetected mechanical failure.

It is therefore advantageous to control the temperature of electrical heating device, in order to avoid degrading surrounding components.

To this end, it is known practice to provide an additional sensor such as a thermal probe that is able to measure the temperature of the electrical heating device directly. Such a thermal probe may for example be arranged in contact with the heating modules or in the electronic control unit, and especially on the printed circuit board. Depending on the temperature noted, the electrical power may be cut or limited.

However, provision of this additional sensor that directly measures temperature generates an additional cost, requires additional space on the printed circuit board and adds weight to the electrical heating device. Moreover, the detection of overheating by this means depends on the distance between the sensor and the resistive elements, and generally on the inertia of the system. In addition, this adds a possibility of additional failure in the event of malfunction, for example, of the additional sensor.

The objective of the invention is to at least partially mitigate these drawbacks of the prior art by providing an alternative solution allowing overheating of the electrical heating device to be detected.

To this end, the invention relates to a method for detecting overheating for an electrical heating device comprising a plurality of resistive elements configured to be electrically supplied by an electrical voltage source, wherein the electrical supply of the resistive elements is driven by a pulse-width modulated drive signal depending on a power setpoint, or a temperature setpoint, or a resistance setpoint, or a setpoint for an amplitude of an electrical current. Said method comprises the following steps:

noting said setpoint, noting the duty cycle of the pulse-width modulated drive signal of the predefined number of resistive elements, defining a detection threshold value of the duty cycle of the pulse-width modulated drive signal of the predefined number of resistive elements, the detection threshold value being representative of overheating of the electrical heating device, depending on the measured supply voltage and/or said setpoint, or on a value of at least one parameter for monitoring overheating of the electrical heating device, comparing the noted value of said duty cycle to the detection threshold value, and detecting overheating when the noted value of said duty cycle reaches said defined duty-cycle detection threshold value.

Said method may also comprise one or more of the following features, implemented separately or in combination:

According to one preferred embodiment, said method comprises an additional step of measuring the value of the amplitude of the electrical current flowing through a predefined number of resistive elements.

Said at least one parameter for monitoring overheating of the electrical heating device may be dependent on the amplitude of the electrical current. Said method may comprise an additional step of computing the value of said at least one parameter when said at least one parameter is different from the amplitude of the electrical current.

According to one embodiment, the method comprises a step of measuring the supply voltage.

According to this embodiment, the detection threshold value of the duty cycle of the pulse-width modulated drive signal of the predefined number of resistive elements may also be determined depending on the measured supply voltage.

Preferably, the electrical supply is dependent on a power setpoint.

The power setpoint may itself be dependent on a temperature setpoint.

Said detection threshold value may be defined depending on the power setpoint or on the temperature setpoint.

The method may comprise an additional step of computing the value of said at least one parameter when said at least one parameter is different from the amplitude of the electrical current.

According to one aspect of the invention, the value of said at least one parameter may be computed from the measured amplitude of the electrical current flowing through the predefined number of resistive elements and optionally from the measured supply voltage.

As a variant or in addition, the value of said at least one parameter is computed from said noted duty cycle.

Said at least one parameter may be chosen from the electrical resistance of the predefined number of resistive elements, the amplitude of the electrical current flowing through the predefined number of resistive elements, a multiple or a power of the amplitude of the electrical current flowing through the predefined number of resistive elements, and the electrical power of the predefined number of resistive elements.

According to one variant embodiment, the resistive elements are elements of positive temperature coefficient. According to another variant embodiment, the resistive elements are elements of negative temperature coefficient.

According to another aspect of the invention, the measured amplitude of the electrical current is the amplitude of the instantaneous electrical current flowing through the predefined number of resistive elements, when the pulse-width modulated drive signal is 100%.

Said method may comprise the following steps: verifying whether at least one criterion of said device is representative of a cold state of said device, and inhibiting at least the step of detecting overheating when said at least one criterion is representative of a cold state.

According to another aspect of the invention, at least two subsets of separate resistive elements are driven independently by pulse-width modulation of the electrical supply. For each subsystem, a value of said at least one chosen parameter may be computed independently. As a variant or in addition, a detection threshold value of the duty cycle of the drive signal may be independently defined, depending on the nature and/or the number of resistive elements of the subset.

The invention also relates to a control unit for an electrical heating device comprising a plurality of resistive elements configured to be electrically supplied by an electrical voltage source, the control unit being configured to generate a pulse-width modulated drive signal for driving the electrical supply of the resistive elements depending on a power setpoint, or a temperature setpoint, or a resistance setpoint, or a setpoint for an amplitude of an electrical current. The control unit comprises at least one processing means for:

noting said setpoint, noting the duty cycle of the pulse-width modulated drive signal of the predefined number of resistive elements, defining a detection threshold value of the duty cycle of the pulse-width modulated drive signal of the predefined number of resistive elements, the detection threshold value being representative of overheating of the electrical heating device, depending on the measured supply voltage and/or said setpoint, or on a value of at least one parameter for monitoring overheating of the electrical heating device, and comparing the noted value of said duty cycle to the detection threshold value, and detecting overheating when the noted value of said duty cycle reaches said defined duty-cycle detection threshold value.

Further features and advantages of the invention will become more clearly apparent on reading the following description, which is given by way of nonlimiting illustrative example, and from the appended drawings, in which.

In these figures, identical elements have been designated with the same references.

Figure 1A:
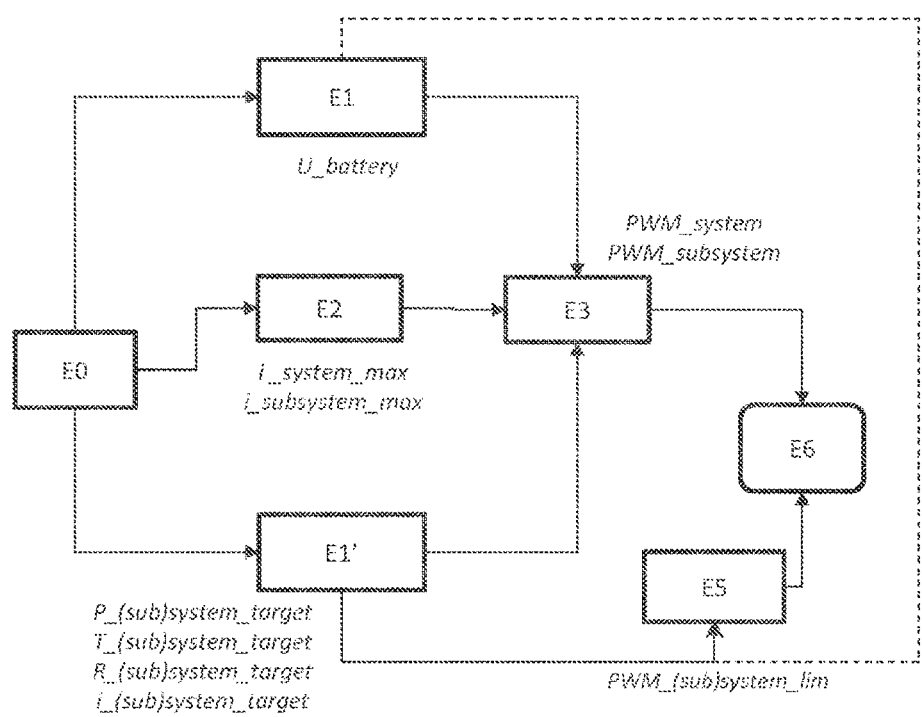
FIG. 1a shows a flowchart of various steps of the detecting method according to a first embodiment.

The following embodiments are examples. Although the description refers to one or more embodiments, this does not necessarily mean that each reference relates to the same embodiment, or that the features apply only to one embodiment. Individual features of various embodiments may also be combined or interchanged in order to create other embodiments.

The invention relates to the field of a heating and/or ventilation and/or air-conditioning apparatus with which a motor vehicle is intended to be equipped with a view to regulating the aerothermal parameters of the air flow delivered to one or more regions of the passenger compartment of the vehicle.

The invention more particularly relates to a motor-vehicle electrical heating device (also called an electrical radiator) with which such an apparatus is especially equipped. It is a question of an electrical device for heating a fluid. Nonlimitingly, it may be a question of a device for heating an air flow. Below, the description is given with reference to an air flow, but the invention may be applied to another fluid.

In particular, it may be a question of an high-voltage radiator or electrical heating device. Here, a high voltage is defined as a voltage higher than 90 V or 120 V. As a variant, it may be a question of a low-voltage radiator.

The electrical heating device is able to convert electrical energy drawn, for example, from the vehicle into thermal energy that is transferred to the air flowing through the heating and/or ventilation and/or air-conditioning apparatus 1.

The electrical heating device may comprise a predefined number of heating modules. These heating modules may be arranged so as to be directly exposed to the air flow flowing through the electrical heating device.

More precisely, the heating modules may each comprise resistive elements of positive temperature coefficient (PTC). The resistive elements for example take the form of PTC ceramic resistors. As a variant, it may be a question of resistive elements of negative temperature coefficient (NTC).

The electrical heating device generally furthermore comprises an electronic control unit for controlling the heating modules. Such a control unit comprises one or more electronic and/or electrical components. The control unit especially comprises an electrical circuit (not shown) for supplying the resistive elements. The electrical supply circuit is for example mounted on an electrical circuit board such as a printed circuit hoard (or PCB to use the well-known acronym).

By way of example, the electrical supply circuit comprises transistors (not shown), each allowing the passage of current through a predefined number of heating modules to be permitted or not.

The resistive elements are intended to be supplied by an electrical power source (not shown), such as batteries, of the vehicle for example. The electrical supply of the resistive elements is driven by pulse-width modulation (or PWM to use the well-known acronym). The control unit is configured to generate a pulse-width modulated drive signal for driving the electrical supply of the resistive elements. At least two separate subsets of resistive elements may be driven independently by pulse-width modulation. The electrical supply of the resistive elements may be performed depending on an electrical power setpoint. The device is controlled in a closed-loop mode. As a variant, the electrical supply of the resistive elements may be performed depending on a temperature setpoint, or optionally a resistance setpoint, or indeed a setpoint for an amplitude of an electrical current.

Figure 1B:
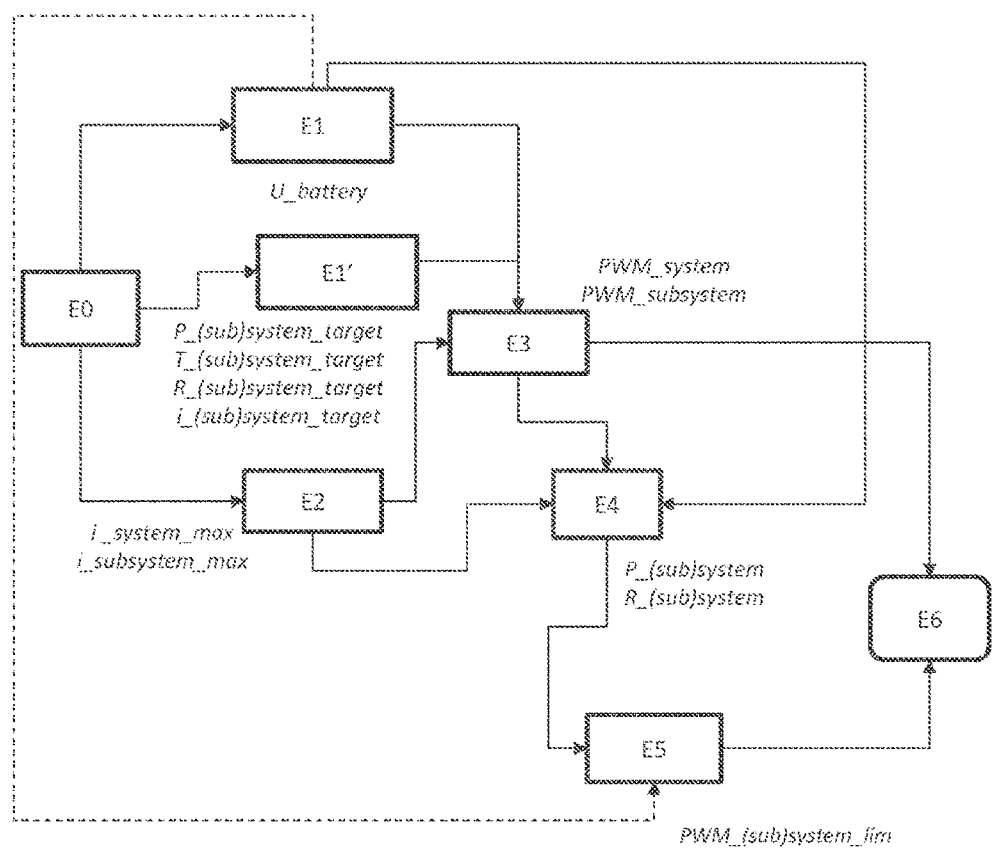
FIG. 1b shows a flowchart of various steps of the detecting method according to a second embodiment.

With reference to FIG. 1a or FIG. 1b, a method for detecting overheating for such an electrical heating device, allowing potential overheating of this device to be detected in real time, will now be described.

It is possible to monitor all the heating modules together, or to independently monitor each subset of heating modules controlled by one transistor or a plurality of transistors. This especially allows various hot spots to be detected, for example when the electrical heating device is installed in a so-called multi-zone heating and/or ventilation and/or air-conditioning apparatus (in this case the heating modules may be dedicated to heating separate regions of the passenger compartment).

According to one variant embodiment, provision may be made for a step E0 of activating or initializing the method.

Generally, the method comprises a step E1' of noting the setpoint. Preferably, it is a question of a power setpoint P_(sub)system_target. It could also be a question of a temperature setpoint T_(sub)system_target, or possibly of a resistance setpoint R_(sub)system_target, or indeed of an amplitude setpoint i_(sub)system_target. The prefix "sub" has been written between brackets to indicate that the setpoint may relate either to one subsystem, or to all the resistive elements.

The method may also include a step E1 in which the supply voltage U_battery is noted or measured. This step E1 may be implemented using a sensor for measuring voltage. The supply voltage U_battery may be constant.

The method may comprise a step E2, in which the value of the amplitude i_system_max or i_subsystem_max of the electrical current flowing through a predefined number of resistive elements or even all of the resistive elements of the electrical heating device is noted or measured. It is a question of noting the consumption of current of the floating module(s) of a subset a parameter of which it is desired to monitor. For example, the instantaneous current flowing through the resistive elements is measured. This step E2 may be implemented using a sensor for measuring current.

The measured current is for example the maximum instantaneous current or the current of a peak when the pulse-width modulated drive signal is to 100%.

In step E3, the duty cycle PWM_system or PWM_subsystem of the pulse-width modulated drive signal of the predefined number of resistive elements is noted. In the rest of the description, PWM_(sub)system, with "sub" between brackets, indicates that the duty cycle of the pulse-width modulated drive signal may relate to one subsystem, or to all the resistive elements.

The method may comprise a step E4 (see FIG. 1b) in which the value of at least one parameter for monitoring overheating of the electrical heating device is computed.

Advantageously, to monitor overheating of the electrical heating device, this parameter is dependent on the amplitude i_subsystem_max of the electrical current flowing through the predefined number of resistive elements, or even on the amplitude i_system_max of the electrical current flowing through all of the resistive elements. This step E4 may be implemented by a processing means such as a computer. It may be a question of the actual value of the parameter.

The value of the parameter may be computed from the amplitude i_system_max; i_subsystem_max measured in step E2 of the electrical current flowing through the predefined number of resistive elements. The supply voltage U_battery measured in step E1, when this step E1 is implemented, may furthermore be taken into account in the computation of step E4.

As a variant or in addition, a or the parameter may be dependent on the noted value of the duty cycle PWM_(sub)system of the pulse-width modulated drive signal of the predefined number of resistive elements.

This step E4 may be carried out for one or more subsystems, i.e. for one or more sets of heating modules controlled by one or more transistors, or for the whole system, i.e. all of the resistive elements for all the heating modules.

The parameter may be the electrical resistance R_system; R_subsystem of the predefined number of resistive elements, the electrical power P_system; P_subsystem of the predefined number of resistive elements, the amplitude i_system_max; i_subsystem_max of the electrical current flowing through the predefined number of resistive elements, or a multiple or a power of the amplitude of the electrical current flowing through the predefined number of resistive elements. In particular, the computing step E4 is implemented when the chosen parameter is not the amplitude of the electrical current.

Alternatively, the parameter may not be dependent on the amplitude of the electrical current. It may for example be a question of the temperature of the resistive elements.

A plurality of parameters may be used in a complementary manner to monitor for overhearing of the electrical heating device during the implementation of the method.

In step E5, a detection threshold value PWM_(sub)system_lim of the duty cycle of the pulse-width modulated drive signal of the predefined number of resistive elements is defined, the detection threshold value being representative of overheating of the electrical heating device.

This detection threshold value PWM_subsystem_lim of said duty cycle may be defined depending on the setpoint (preferably the power setpoint P_(sub)system_target) noted in step E1', as schematically shown in FIG. 1a.

As a variant, when step E1 is implemented beforehand, the detection threshold value PWM_(sub)system_lim may be defined depending on the pair consisting of the supply voltage U_battery measured in E1 and of the setpoint (preferably the power setpoint P_(sub)system_target) noted in step E1'. In this case, both step E1 and step E1' are implemented beforehand, as schematically shown by the dashed arrow between E1 and E5 and the solid arrow between E1' and E5 in FIG. 1a.

Also as a variant, the duty-cycle detection threshold value PWM_(sub)system_lim may be defined depending on the value of the chosen parameter computed in step E4, as schematically shown in FIG. 1b, or on the value of the electrical-current amplitude noted in step E2.

The detection threshold value may also be defined depending on the pair consisting of the supply voltage U_battery measured in step E1 and of the value of the chosen parameter that was computed in step E4. In this case, both step E1 and step E1' are implemented beforehand, as schematically shown by the dashed arrow between E1 and E5 and the solid arrow between E4 and E5 in FIG. 1b. The detection threshold value may also be defined depending on the pair consisting of the supply voltage U_battery measured in step E1 and of the value of the electrical-current amplitude noted in step E2.

In a step E6, the value noted in step E3 of the duty cycle PWM_(sub)system is compared to the detection threshold value PWM_(sub)system_lim), which was defined in step E5 or is preset.

This step E6 may be implemented by a processing means such as a comparator. Depending on the comparison result, overheating may be detected. In other words, if the noted value of the duty cycle has reached or crossed the defined duty-cycle detection threshold value, this corresponds to overheating of the device. The noted value of the duty cycle may cross the detection threshold value by becoming higher or lower than it, depending on the nature of this parameter and depending on the nature of the resistive elements. In this case, one or more actions against this overheating, which are not detailed below, may be implemented. In the contrary case, the steps of the method may be reiterated until overheating is detected in step E6.

When the method takes into account one or more parameters, according to a first approach, one or the parameter may be the electrical resistance of the heating modules. In this case, in step E4, an electrical resistance value R_system; R_subsystem of the predefined number of resistive elements may be computed from the measured supply voltage U_battery and from the measured amplitude i_system_max; i_subsystem_max of the electrical current. In the rest of the description, R_(sub)system, with "sub" between brackets, indicates that the electrical-resistance value may relate to one subsystem, or to all the resistive elements. The duty-cycle detection threshold value PWM_(sub)system_lim is determined in step E5 depending on the value R_(sub)system computed in step E4 of the electrical resistance of the predefined number of resistive elements, and possibly also on the supply voltage U_battery measured in step E1.

This value may be determined for one or more subsystems, i.e. for one or more sets of heating modules controlled by one or more transistors, or for the whole system, i.e. all of the resistive elements for all the heating modules.

In step E6, the value of the duty cycle PWM_(sub)system noted in step E3 is compared to the detection threshold value PWM_(sub)system_lim) thus determined in step E5.

According to a second approach, a or the parameter may be the electrical power of the predefined number of resistive elements. This second approach may be implemented as a variant or in addition to the first approach.

Only differences with respect to the first approach are detailed below. In step E4, an electrical power value P_system; P_subsystem of the predefined number of resistive elements may be computed from the measured supply voltage U_battery and from the measured amplitude i_system_max; i_subsystem_max of the electrical current. For this second approach, the duty cycle noted in step E3 is also taken into account in the computation of electrical power in step E4. In particular, the electrical power may be computed by calculating the product of the amplitude of the instantaneous electrical current, of the supply voltage and of the duty cycle.

In the rest of the description, P_(sub)system, with "sub" between brackets, indicates that the electrical-power value may relate to one subsystem, or to all the resistive elements.

The duty-cycle detection threshold value PWM_(sub)system_lim may be determined in step E5 depending on this value P_(sub)system computed in step E4 of the electrical power of the predefined number of resistive elements, and possibly on the supply voltage U_battery measured in step E1.

In step E6, the value of the duty cycle PWM_(sub)system noted in step E3 is compared to the detection threshold value PWM_(sub)system_lim) thus determined in step E5.

According to yet a third approach, a or the parameter may be the amplitude of the electrical current flowing through the predefined number of resistive elements. This third approach may be implemented as a variant or in addition to the first approach and/or the second approach.

This third approach (not shown in the figures) differs from the second approach in that there is no computing step E4, the value of the parameter instead being measured in step E2. The duty-cycle detection threshold value PWM_(sub)system_lim may be determined in step E5 depending on the amplitude value i_system_max or i_subsystem_max measured in step E2, and possibly on the supply voltage U_battery measured in step E1.

In step E6, the value of the duty cycle PWM_(sub)system noted in step E3 is compared to the detection threshold value PWM_(sub)system_lim) thus determined in step E5.

The parameter may also be a multiple or a power of die amplitude of the electrical current flowing through the predefined number of resistive elements. Mention may be made, non-exhaustively, of the square or cube of the amplitude of the electrical current, of two times the amplitude of the electrical current or even of the ratio of the amplitude of the electrical current to the duty cycle of the pulse-width modulated drive signal.

Lastly, according to yet another approach, when the parameter is not dependent on the amplitude of the electrical current, such as is for example the case with the temperature of the resistive elements, the value of such a parameter may for example be measured.

Figure 2:
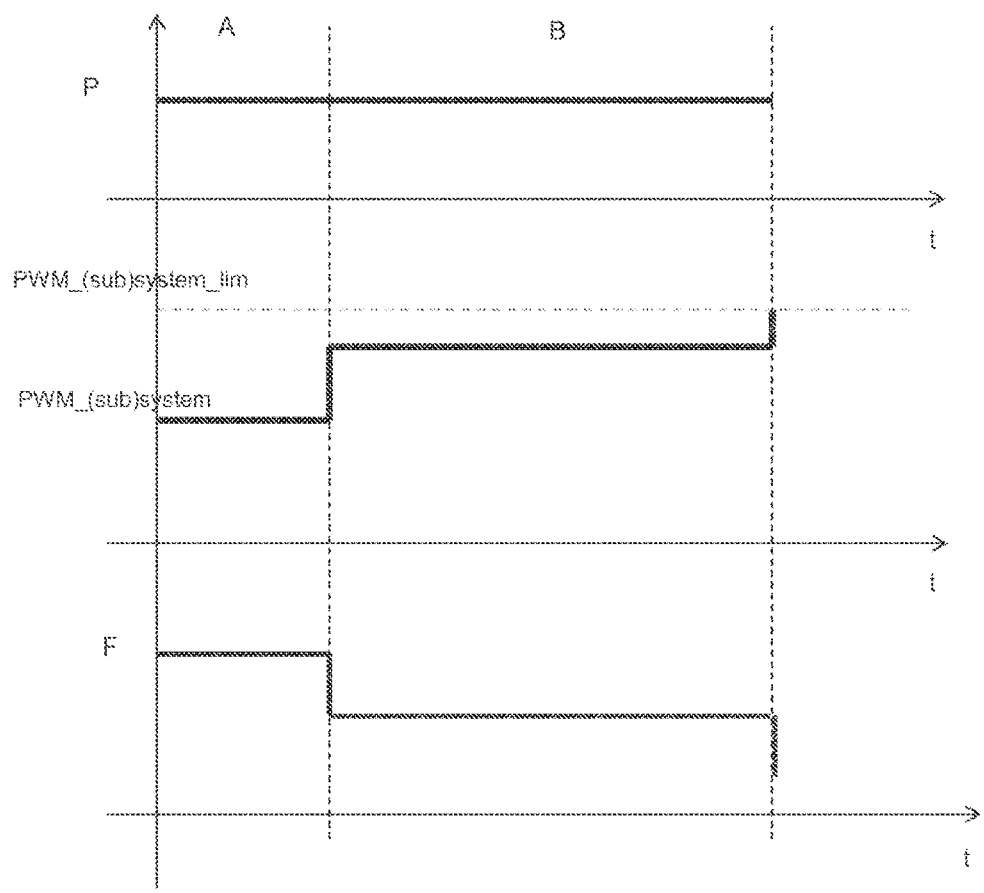
FIG. 2 is a graph schematically showing an example of the variation in the electrical power and in the duty cycle of the pulse-width modulated drive signal in the event of a drop in air flow rate.

The general principle of such a method is schematically shown in a simplified manner in FIG. 2. In this graph, various phases of operation of the electrical heating device comprising a predefined number of heating modules each comprising resistive elements, of positive temperature coefficient (PTC) for example, are illustrated. Curves of the electrical power P, of the duty cycle PWM_(sub)system of the drive signal, and of the air flow F are schematically shown. During phase A, the device is operating faultlessly, under the normal conditions of use, especially as regards the air flow rate and the temperature of the air flow. Phase B corresponds to a first drop in air flow, this drop in air flow being shown by curve F. During this phase B, the duty cycle PWM_(sub)system of the pulse-width modulated drive signal increases to avoid a drop in power, but does not reach the duty-cycle detection threshold value PWM_(sub)system_lim defined in step E5 (see also FIG. 1a or 1b). In the illustrated example, as the air flow rate is not too low, this compensation allows the power to be maintained during phase B.

The graph illustrates a second drop in air flow at the end of phase B. Once more, the duty cycle PWM_(sub)system of the pulse-width modulated drive signal increases to avoid a drop in power. The duty cycle cannot increase beyond the duty-cycle detection threshold value PWM_(sub)system_lim defined in step E5. When the duty cycle reaches this duty-cycle detection threshold value PWM_(sub)system_lim, this corresponds to detection of overheating of the device in step E6. In this example, the noted value of the duty cycle crosses the defined duty-cycle detection threshold value from below, i.e. by becoming greater than it.

Moreover, in the above description, steps E0 to E6 have been indexed first step, second step, and so on. It is a question of simple indexing for differentiating between and naming the various steps of the method. This indexation does not necessarily imply a priority of one step over another. The order of certain steps of this method may be inverted without departing from the scope of the present description. This indexation also does not imply an order in time. Some steps may for example be carried out at the same time.

The method according one or other of the variants described above may furthermore comprise at least one verifying step, in which it is verified whether a criterion of the electrical heating device is representative of a cold state.

This may occur, for example at start-up, especially when the resistance of the heating device is very high and the value of the duty cycle is very high so that the detection threshold value is crossed. Detecting overheating at this point, which would be incorrect, while the device is still cold and the current low, would not allow the device to heat up.

The criterion is for example the temperature of an electrical circuit board on which is mounted an electrical supply circuit of the resistive elements.

During the verifying step, the temperature of the electrical circuit board is noted, for example via a temperature sensor, such as a thermal probe with a negative temperature coefficient.

When the noted temperature reaches or crosses a predefined threshold representative of a minimum heating of the electrical heating device, this confirms that the device is ready to be detected.

In the contrary case, this is representative of a cold state or of "underheating" of the device. The method may comprise a step of inhibiting at least the step of detecting overheating for as long as the criterion, such as the electrical-circuit-board temperature, is representative of this cold state.

In the case of a thermal probe with a negative temperature coefficient, the predefined threshold may be a minimum value below which no attempt is trade to detect overheating.

This allows incorrect or untimely detection of overheating to be avoided.

Such a verification may for example be carried out in step E0.

The method for detecting overheating such as described above may be implemented by a control unit. In particular, the method for detecting overheating may be implemented by the control unit that is already used to control the heating modules of the electrical heating device.

The control unit is therefore configured to monitor for overheating according to the detecting method described above. To this end, the control unit comprises at least one processing means for implementing the steps of the method described above.

In particular, the control unit comprises one or more processing means for noting the power setpoint P_(sub)system_target, or the temperature setpoint T_(sub)system_target, or the resistance setpoint R_(sub)system_target, or even the setpoint i_(sub)system_target of the amplitude of the electrical current.

The control unit for example comprises a sensor for measuring voltage, in order to measure or note the supply voltage U_battery.

The control unit for example comprises a sensor for measuring current, in order to measure or note the current i_(sub)system_max flowing through the predefined number of resistive elements or even all of the resistive elements.

The control unit for example comprises a processing means for determining or noting the duty cycle PWM_(sub)system of the pulse-width modulated drive signal of the predefined number of resistive elements.

The control unit may in addition comprise one or more computing means, for example for computing the value of at least one parameter depending on the amplitude i_system_max; i_subsystem_max of the electrical current flowing through the predefined number of resistive elements for monitoring overheating of the electrical healing device when this parameter is different from the electrical-current amplitude, especially on the basis of the measurement of the current i_(sub)system_max and possibly of the supply voltage U_battery.

The or other computing means may also be configured to define a detection threshold value PWM_(sub)system_lim of the duty cycle of the pulse-width modulated drive signal of the predefined number of resistive elements, the threshold value being representative of overheating of the electrical heating device and being defined depending on the setpoint or on a value of at least one parameter depending on the amplitude of the electrical current for monitoring overhearing of the electrical heating device, which value will possibly be computed beforehand, or as a variant depending on the pair consisting of the supply voltage and of the setpoint or on the value of the parameter.

The control unit for example comprises at least one comparator for comparing the noted value of said duty cycle PWM_(sub)system to the detection threshold value PWM_(sub)system_lim.

The control unit may comprise a computing means or a microprocessor for determining, depending on the results of the comparisons, whether there is overheating. The microprocessor may especially evaluate whether the noted value of said duty cycle is higher than or equal to said defined duty-cycle detection threshold value.

The control unit may also comprise at least one processing means for verifying whether a criterion of the electrical heating device is representative of a cold state of the device.

For example, provision may be made for an additional temperature sensor (not shown in the figures). The control unit may comprise this additional temperature sensor, Such a temperature sensor may be placed on and, for example, soldered, brazed, or adhesively bonded to, the printed circuit hoard (PCB). It may be a question of a thermal probe of negative temperature coefficient (NTC) the electrical resistance of which decreases uniformly with temperature. As an alternative, it could be a question of a thermal probe of positive temperature coefficient (PTC), the electrical resistance of which increases sharply with temperature.

The control unit may for example comprise a comparator for comparing the noted temperature of the electrical circuit board to a predefined threshold representative of a minimum heating of the electrical heating device. As long as the noted temperature does not reach this predefined threshold, this is representative of a cold state of said device, and the control unit may comprise a processing means for inhibiting the detection of overheating.

Thus, by proactively defining a detection threshold value of the duty cycle of the pulse-width modulated drive signal, the method according to the invention makes it possible to detect in real time overheating in an indirect manner when the duty cycle reaches a detection threshold value. This makes it possible to prevent the electrical heating device from becoming hot enough that, even if a fire is not started, there is a risk of damage to certain surrounding components.

In addition, no additional sensor is required to monitor the temperature of the electrical heating device.

The invention claimed is:

1. A method for detecting overheating of an electrical heating device comprising a plurality of resistive elements configured to be electrically supplied by an electrical voltage source, wherein the electrical supply of the resistive elements is driven by a pulse-width modulated drive signal depending on a power setpoint, or a temperature setpoint, or a resistance setpoint, or a setpoint for an amplitude of an electrical current, the method comprising:
 noting, via a computer, the setpoint;
 noting a duty cycle of the pulse-width modulated drive signal of a predefined number of resistive elements;
 defining a detection threshold value of the duty cycle of the pulse-width modulated drive signal of the predefined number of resistive elements, the detection threshold value being representative of overheating of the electrical heating device, the detection threshold value being defined depending on the setpoint or on a value of at least one parameter for monitoring overheating of the electrical heating device;
 comparing the noted value of the duty cycle to the detection threshold value;
 detecting a cold state with a thermal probe;
 detecting overheating when the noted value of the duty cycle reaches the defined duty-cycle detection threshold value, and
 verifying whether at least one criterion of the electrical heating device is representative of the cold state of the electrical heating device, and inhibiting at least the step of detecting overheating based on the verification,
 wherein the at least one parameter is measured with a sensor, and
 wherein the sensor comprises at least one of a current sensor and a voltage sensor,
 wherein at least one of the plurality of resistive elements comprises a positive temperature coefficient (PTC).

2. The method as claimed in claim 1, further comprising: measuring the value of the amplitude of the electrical current flowing through a predefined number of resistive elements.

3. The method as claimed in claim 2, wherein the at least one parameter for monitoring overheating of the electrical heating device is dependent on the amplitude of the electrical current, the value of the at least one parameter being computed when the at least one parameter is different from the amplitude of the electrical current.

4. The method as claimed in claim 1, further comprising: measuring the supply voltage.

5. The method as claimed in claim 4, wherein the detection threshold value of the duty cycle of the pulse-width modulated drive signal of the predefined number of resistive elements is also determined depending on the measured supply voltage.

6. The method as claimed in claim 4, wherein, when the at least one parameter is different from the amplitude of the electrical current, the value of the at least one parameter is computed from the measured supply voltage and from a measured amplitude of the electrical current flowing through the predefined number of resistive elements.

7. The method as claimed in claim 1, wherein the electrical supply is dependent on the power setpoint and wherein the detection threshold value is defined depending on the power setpoint.

8. The method as claimed in claim 7, wherein the power setpoint is dependent on the temperature setpoint.

9. The method as claimed in claim 1, wherein the at least one parameter is chosen from:
 the electrical resistance of the predefined number of resistive elements,
 the amplitude of the electrical current flowing through the predefined number of resistive elements,
 the amplitude of the electrical current flowing through the predefined number of resistive elements multiplied by a numerical factor or raised to an exponential power, and
 the electrical power of the predefined number of resistive elements.

10. The method as claimed in claim 1, wherein the resistive elements are elements of positive or negative temperature coefficient.

11. The method as claimed in claim 1, wherein a measured amplitude of the electrical current is the amplitude of the instantaneous electrical current flowing through the predefined number of resistive elements, when the pulse-width modulated drive signal is 100%.

12. The method as claimed in claim 1, wherein:
 at least two subsets of separate resistive elements are driven independently by pulse-width modulation of the electrical supply, and
 for each subset, a detection threshold value of the duty cycle of the drive signal is independently defined, depending on the number of resistive elements of the subset.

13. The method as claimed in claim 1, wherein the at least one criterion of the device comprises a temperature measurement, and the method further comprises determining the temperature measurement is representative of a cold state when the temperature measurement is less than a predefined temperature threshold.

14. The method as claimed in claim 1, wherein at least another one of the plurality of resistive elements comprises a negative temperature coefficient (NTC).

15. A control unit for an electrical heating device comprising a plurality of resistive elements configured to be electrically supplied by an electrical voltage source, the control unit being configured to generate a pulse-width modulated drive signal for driving the electrical supply of the resistive elements depending on a power setpoint, or a temperature setpoint, or a resistance setpoint for an amplitude of an electrical current, the control unit comprising at least one computer configured for:
 noting the setpoint;
 noting a duty cycle of the pulse-width modulated drive signal of a predefined number of resistive elements;
 defining a detection threshold value of the duty cycle of the pulse-width modulated drive signal of the predefined number of resistive elements, the detection threshold value being representative of overheating of the electrical heating device, depending on the setpoint or on a value of at least one parameter for monitoring overheating of the electrical heating device;
 comparing the noted value of the duty cycle to the detection threshold value;

detecting a cold state with a thermal probe, and detecting overheating when the noted value of the duty cycle reaches the defined duty-cycle detection threshold value, wherein the at least one parameter is measured with a sensor;

wherein the sensor comprises at least one of a current sensor and a voltage sensor, and wherein the control unit is configured to verify whether a criterion of the electrical heating device is representative of the cold state of the electrical heating device, and inhibit at least the step of detecting the overheating based on the verification, wherein at least one of the plurality of resistive elements comprises a positive temperature coefficient (PTC).

16. The control unit as claimed in claim 15, wherein the at least one criterion of the device comprises a temperature measurement, and the control unit determines that the temperature measurement is representative of a cold state when the temperature measurement is less than a predefined temperature threshold.

17. The control unit as claimed in claim 15, wherein at least another one of the plurality of resistive elements comprises a negative temperature coefficient (NTC).

* * * * *